United States Patent [19]

Johnson

[11] 4,415,674

[45] Nov. 15, 1983

[54] ELECTRICAL INSULATING REFRACTORY COMPOSITION

[75] Inventor: Walter R. Johnson, Chuckey, Tenn.

[73] Assignee: Combustion Engineering, Inc., Windsor, Conn.

[21] Appl. No.: 367,198

[22] Filed: Apr. 12, 1982

[51] Int. Cl.$^3$ .................. C04B 35/04; C04B 35/48
[52] U.S. Cl. .................. 501/104; 174/102 P; 174/118; 174/137 B
[58] Field of Search .................. 501/104; 174/102 P, 174/118, 137 B; 338/238

[56] References Cited

U.S. PATENT DOCUMENTS 3,457,092  7/1969  Tervo .................. 501/104

FOREIGN PATENT DOCUMENTS 49-96005  9/1974  Japan .................. 501/104
1108396  4/1968  United Kingdom .................. 501/104

*Primary Examiner*—James Poer
*Attorney, Agent, or Firm*—Richard H. Berneike

[57] ABSTRACT

Sheathed electrical heating elements containing MgO heat conductive, electrical insulating material having an additive of fine particles of spherically shaped fused $ZrO_2$ to increase the electrical resistivity and maintain favorable tap density and flow properties. The spherically shaped $ZrO_2$ particles are formed by gravitationally separating the $ZrO_2$ particles from ground fused zircon ($ZrO_2.SiO_2$).

4 Claims, No Drawings

ELECTRICAL INSULATING REFRACTORY COMPOSITION

BACKGROUND OF THE INVENTION

This invention relates to sheathed electrical heating elements and more particularly to an electrical insulating refractory composition for use therein.

Sheathed electrical heating elements are used extensively in many heating applications. These elements consist of a metal sheath, an electrical heating element located within the sheath and an electrical insulating material embedding the heating element within the sheath. Generally, the embedding material is fused magnesium oxide particles which has excellent thermal conductivity while maintaining high electrical resistivity.

The high temperatures which are reached in such heating elements and their continued use over a long period of time and the thermal cycling tends to degrade the insulating materials. For this reason, many different combinations of materials have been investigated with varying degrees of success. The object is to form an embedding composition which will be stable over a wide range of temperatures both as to electrical resistivity and thermal conductivity. Although there are materials which can be added to the magnesium oxide which will enhance these properties, there are other factors to be taken into consideration. More specifically, the embedding material must be able to be packed by tapping or vibrating to a relatively dense material prior to the final densification which is accomplished by roll reducing the filled tube. The density attained by tapping or vibrating is referred to as the "tap density" or "F" density it is measured by the ASTM Procedure No. 3347-74. The other property which is effected by additives is the flowability of the embedding material powder. It is necessary that adequate flowability be maintained so that the powder will flow through the machines which are normally used by the heating element industry. The current technique employed for manufacture of electrically insulating magnesium oxide powders includes grinding and sizing which reduces the magnesium oxide particle size dimension such that all particles will pass a U.S. Standard 40 mesh sieve (0.0165 inches). The particles are then polished by standard process which will increase the tap density of the powder. This is followed by calcining which increases the electrical resistivity.

Calcining is accomplished by heating the magnesium oxide powder to a temperature in excess of 1200° C. Electrical resistivity is increased by the calcining process wherein oxygen deficiencies of the magnesium oxide crystal latice are satisfied and oxidation of various impurity phases is completed. Because of its tendency to sinter at temperatures above 1100° C., magnesium oxide powders lose a portion of their ability to flow and suffer a reduction in tap density because of the calcining process. These latter properties may be reduced to unacceptable levels during the calcining. Therefore, it is normally necessary to make a compromise with respect to the calcining process such that increased electrical resistivity can be obtained without overly reducing the tap density and flowability. This means that the maintenance of adequate tap density and flowability requires that electrical resistivity be accepted which is lower than the potential maximum.

SUMMARY OF THE INVENTION

The present invention relates to magnesium oxide heat conductive electrical insulating compositions and to sheathed electrical heating elements in which the compositions are used. More particularly, the composition is an MgO material which has a high degree of calcination with the resultant high electrical resistivity together with an additive in the form of fine particles of spherically shaped fused $ZrO_2$ which will increase the electrical resistivity and maintain favorable tap density and flow properties.

DESCRIPTION OF THE PREFERRED EMBODIMENT

It has been known in the past that the electrical resistivity and thermal conductivity of MgO electrical insulating materials can be increased by the use of minor amounts of fused zircon. For examples, see U.S. Pat. No. 3,457,092. The problem that arises from the addition of zircon is that significantly reduces the flow properties of the mixtures. This tends to make such mixtures impractical for use in the filling machines normally used by the heating element industry.

The present invention involves the use of a specially formed zirconia. The zirconia is spherically shaped fused $ZrO_2$ which is produced by gravitationally separating the $ZrO_2$ particles from the fused silica ($SiO_2$) particles of a ground fused zircon ($ZrO_2 \cdot SiO_2$). This is accomplished by suspending a $-200$ mesh fused zircon into a water slurry at about a 50% concentration. The heavier fused zirconia particles are then allowed to settle leaving the fused silica particles in suspension. The fused silica suspension is then decanted from the settled zirconia particles. The collected fused zirconia particles are then dried and used as the additive for the present invention. The following table compares the use of this spherically shaped fused zirconia with milled zircon, a commercially available fused zirconia and fused zircon.

| MECHANICAL PROPERTIES AND ELECTRICAL RESISTIVITY AT 890° C. | | | | | | MEGOHM-INCHES | |
|---|---|---|---|---|---|---|---|
| COMPOUND DESCRIPTION | | "F" DENSITY g/cc | FLOW RATE Sec/100 gm | STATIC Flow (gm) | ELONGATION % | 2 Hours | 20 Hours |
| MgO Sample 1 | | 2.39 | 185 | 46 | 18.7 | 214 | 76 |
| MgO Sample 1 | 2% | 2.41 | 185 | 47 | 18.1 | 412 | 206 |
| + Spherical $ZrO_2$ | 4% | 2.42 | 186 | 47 | 18.1 | 435 | 206 |
| MgO Sample 1 | 2% | 2.42 | 198 | 36 | 18.8 | 427 | 213 |
| + Fused Zircon | 4% | 2.42 | 212 | 15 | 17.8 | 290 | 198 |
| MgO Sample 1 + Commercial $ZrO_2$ | 2% | 2.41 | 196 | 34 | 18.1 | 37 | 23 |
| MgO Sample 1 + Milled Zircon | 2% | 2.42 | 192 | 44 | 18.5 | 206 | 92 |
| MgO Sample 2 | | 2.37 | 195 | 40 | 18.0 | 275 | 76 |
| MgO Sample 2 + | 0.5% | 2.40 | 189 | 51 | 19.0 | 527 | 146 |

| MECHANICAL PROPERTIES AND ELECTRICAL RESISTIVITY AT 890° C. | | | | | | | |
|---|---|---|---|---|---|---|---|
| COMPOUND DESCRIPTION | | "F" DENSITY g/cc | FLOW RATE Sec/100 gm | STATIC Flow (gm) | ELONGATION % | MEGOHM-INCHES | |
| | | | | | | 2 Hours | 20 Hours |
| Spherical ZrO$_2$ (−10 microns) | 1.0% | 2.41 | 200 | 48 | 17.0 | 496 | 168 |

"F" Density (which is the same as tap density) is a term used to identify the bulk density of MgO as described in ASTM Procedure No. D-3347-74. It is used to predict the elongation of the heating element during compaction in a rolling mill. "Milled Zircon" is zirconium silicate which has been ball mill ground to −325 mesh.

It can be seen from this table that mixtures of fused magnesium oxide and the spherically formed fused zirconia demonstrate both electrical and mechanical characteristics which are superior to those possessed by either the magnesium oxide alone or the magnesium oxide mixed with other forms of zirconia or zirconia containing materials.

The advantages of the present invention can be realized by the use of fine particles of the spherically formed fused zirconia which are generally −325 mesh. It is noted from the table that the use of −10 micron particles will enhance the electrical and mechanical properties through the use of even smaller amounts of the additive. The optimum percentages of zirconia addition which give the maximum improvements in electrical resistivity and mechanical properties are 0.1% to 8.0% when −325 mesh spherically formed zirconia is used and 0.01% to 2.0% when −10 micron particles are used. In contrast, it can be seen from the table that the use of a milled zircon, a commercially available fused zirconia and fused zircon additives will result in one or more of the properties being adversely effected.

Electrical resistivity values expressed as megohm-inches were measured at 890° C. after the heating element in which they were incorporated had them maintained at that temperature for two and twenty hours respectively. Increasing electrical resistivity is synonymous with increasing quality. Tap density and flow rate were determined by ASTM Standard Test Method for Flow and Tap Density of Electrical Grade Magnesium Oxide, ASTM Designation No. 3347-74. Static flow, which is indicative of angle of repose, was determined by weighing that quantity of powder which will flow from a one quarter inch orifice located at the bottom center of a one-inch deep bed of the powder mixture. Increasing static flow is synonymous with incresing quality.

I claim:

1. A MgO heat conductive electrical insulating embedding composition for sheathing electrical heating elements comprising:
   a. from 92.0 to 99.99 weight % MgO; and
   b. from 0.01 to 8.0 weight % spherically formed zirconia.

2. An MgO embedding composition as recited in claim 1 comprising:
   a. from 92.0 to 99.9 weight % MgO; and
   b. from 0.1 to 8.0 weight % zirconia having a particle size of −325 mesh.

3. An MgO embedding composition as recited in claim 1 comprising:
   a. from 98.0 to 99.99 weight % MgO; and
   b. from 0.01 to 2.0 weight % zirconia having a particle size of −10 microns.

4. A sheathed electrical heating element comprising an electrical resistance heating element, an electrical insulating embedding composition and a metal sheath; the improvement consisting of the electrical insulating embedding material being the composition of claim 1, 2 or 3.

* * * * *